United States Patent Office 2,985,424
Patented May 23, 1961

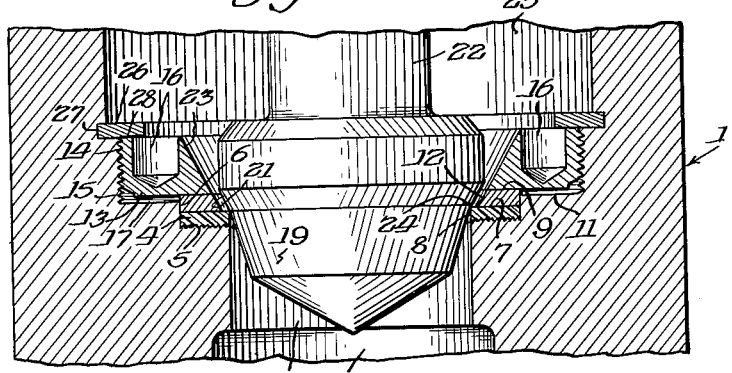

2,985,424

VALVE CLOSURE AND SEAT ELEMENT

Andrew E. Anderson, Berwyn, and Edward W. Urbaniak, Chicago, Ill., assignors to Crane Co., Chicago, Ill., a corporation of Illinois Filed Oct. 31, 1956, Ser. No. 619,528

4 Claims. (Cl. 251—332)

This invention relates generally to a valve construction, and, more particularly, to a novel valve closure and seat element suitable for use on globe, angle, check valves, and the like. Heretofore, one of the difficulties presented in providing an absolutely tight valve seat at extremely low temperatures is the fact that when the valve is exposed to such low temperatures, the valve seating materials would contract and cause the valve to leak.

It should be understood that in the low temperatures, as referred to herein, we have in mind that such temperatures ranged from below zero and to such extremes as minus 320° Fahrenheit.

It is therefore an important object of the present invention to provide a valve seating combination in which the novel valve seat material, together with the structural arrangement of such material, develops beneficially the material shrinkage trend and thereby to avoid objectionable valve seat leakage extant in valves of this type when exposed to low temperatures.

It is a further object to provide a valve seating material in which synthetic plastic materials such as those of the class of polymonochlorotrifluoroethylene or a polymer of trifluorochloroethylene ($CF_2CFCL$) can be used resistant to low temperatures and securely mounted so as to avoid transverse movement thereof and damage even under extremely heavy compression loads encountered during the valve seating operation. One form of such polymer is known to those skilled in the art by the trademark "Kel-F" and manufactured by the M. W. Kellogg Co., Jersey City, N.J.

Another object is to provide a valve seat construction in which even excessively high compression seat loading is predeterminately absorbed or offset by a supplemental seat retaining means cooperating therewith.

Other objects and advantages will become more readily apparent upon proceeding with the specification read in light of the accompanying drawings, in which Fig. 1 is a fragmentary sectional view of a valve seat and disc embodying a preferred embodiment of our invention.

Fig. 2 is a magnified view of a fragmentary sub-section of the structure referred to in Fig. 1.

Fig. 3 is a plan view of a form of retainer locking mechanism employed in connection with the structure in Fig. 1.

Fig. 4 is a view of a modified structure in fragmentary sectional assembly.

Fig. 5 is a magnified view of a fragmentary sub-section of the structure employed in Fig. 4.

Similar reference numerals refer to similar parts throughout the several views.

Referring now to Fig. 1, a valve body or casing, generally designated 1, and which may be a globe or angle valve is provided with the usual valve inlet port 2 leading to the valve seat port 3. The valve outlet is not shown, but is conventional. At the upper end of the valve seat port opening 3, an annular shoulder is provided in the casing which on its plain horizontal surface receives the composition disc 4. The shoulder base portion is made serrated as indicated at 5, the said serrations preferably (but not necessarily) being concentric and having a gripping function relative to the said disc as hereinafter described in greater detail. Instead of serrations, the latter may of course be replaced by a suitably roughened surface, if desired. Upward from the base of the shoulder 4, the annular wall 6 defining the outer limits of the shoulder is provided and within which the disc 4 having the plain upper annular surface 7, is snugly received to bear against the shoulder serrations.

It will be noted that the disc member 4 on its inner periphery is formed with a continuous or unbroken surface portion 8 forming an extension of the casing seat opening 3.

Superposed immediately above the seating member 7 is the washer 9 which is also snugly received within the shoulder wall surface 6, as indicated. Preferably, it is to be noted that it is of a thickness sufficient so that it projects slightly above the casing upper annular outer shoulder 11. On its inner periphery the washer 9 is preferably annularly inclined as at 12 for reasons hereinafter explained. A retaining member 13 is provided on its outer periphery with the threads 14 engaging a similar threaded portion 15 in the valve casing 1. In order to tighten the said retaining member in position, the oppositely disposed wrench sockets 16 are provided on an upper surface. It will be clear that since the threaded retaining member 13 will ultimately be drawn up on the casing threads 15 and positioned against the upper surface of the washer 9, as shown, an annular chamber or clearance 17 will be provided below the retaining member 13 and above the base surface 11 of the casing shoulder which said retaining member overlies in spaced relation as indicated. It will be understood that such annular clearance will preferably be extant even after suitable compression load has been applied and after the serrations 5 have been caused to bite into the disc member 4 as more clearly shown in the magnified sectional view in Fig. 2.

It has been discovered that in the valve closed position by virtue of the fact that under low temperature conditions the disc 4 contracts or shrinks around the closure member, and thus forms annular areas 18 under the highly concentrated pressure load produced by such phenomena thereby to avoid leakage therepast. This is important to understand because ordinarily such shrinkage of the disc will lead to objectionable fluid losses by bypassing the closure member 19. The annular inclined surface 21 makes the closure contact at the disc upper inner peripheral corner 24. It will be appreciated that a reciprocally movable stem 22 suitably actuated by means not illustrated provides for the necessary reciprocating action of the closure member in the usual operations of valve opening and closing. Preferably, but not necessarily, for better flow characteristics, the retainer member 13 is annularly tapered as at 23, forming a continuation of the annular inclined surface 12 of the washer member 9. In the latter connection, it should be understood that as the corner peripheral portion 24 is repeatedly contacted in service by the closure member 19 and flattened, the surface 21 may ultimately bear against the firm surface 12 of the washer 9 thereby to prevent further deformation or crushing of the portion 24 and also supplementing or enlarging the ultimate valve seating area. It will also be clear that upon opening the valve, the closure member is removed from the seat contact at 24, and thereupon line fluid under pressure from the inlet opening 3 will enter the valve chamber 25 and thence move outwardly through the valve outlet and into the usual conduit or piping (not shown).

From this description, it must be apparent that a beneficial valve seat construction has been provided in which the desirable shrinkage of the disc member 4 under very low temperatures facilitates valve seat tightness while at the same time the said disc is substantially contained and well supported to prevent damage under high compression loads. Also improved means for effecting fluid seal between the disc and the casing are provided to overcome objectionable movement of the disc under shrinkage relative to the casing shoulder 5.

In order to guard against the objectionable loosening and the possible loss of the retaining member 13, the latter is preferably held in place by means of a split washer 26, which in plan is shown more clearly in Fig. 3. It will be understood that it is sprung into the casing annular groove 27 to bear against the upper surface 28 of the retaining member 13 after the latter member has been placed in the desired compressive position. For purpose of removal, the member 26 is provided with the inwardly extending lug portions 28 and 29 apertured as at 30, 30 to receive the usual adjustable spanner wrench for gripping and contracting the washer member 26 when it becomes necessary to remove it.

In its operation, it must be understood that under the shrinkage principle of this invention, the seating member 4, such, as for example, made of the synthetic referred to or other suitable plastic material, will contract considerably more than metals, such as stainless steel, or other metals at extremely low temperatures. Therefore, the object of this invention is to provide a structure in which said seat material in the member 4 will contract around the metal valve closure member 19 at extremely low temperatures to enhance seat tightness.

It will also be clear that sufficient compression load must be applied by the retaining member 13 so that when the said contraction of the closure member takes place initially at the narrow annular area 21 of the closure a positive seal will be maintained at the serrated surfaces 5. In order to aid in the fluid sealing at this section of the valve, the body is provided with the concentric serrations 5. Thus, when the member 4 contracts horizontally and in a direction necessarily toward the valve axis, extremely high transverse loads will be applied to that portion of the serrations as at 18, thus to form a tight joint. At the same time, the seat member 4 is so securely retained and well supported it has been found that there is little likelihood of the compression in the valve closing operation, causing objectionable diffusion, distortion or spreading of the seat ring 4. Instead, as indicated, the corner inner peripheral portion, as at 24, may be slightly flattened under extremely high valve closing loads, and thus, in effect, increase the contact surface along the frusto-conical surface 21 of the annular closure member 19 supplemented possibly under such loads by the surface 12 of the washer 9.

As to modifications, it must be understood that under certain circumstances it may be desirable to incorporate within the closure member 19 itself the seat details described in connection with the casing in Figs. 1 and 2. In this connection, for illustrative purposes, attention is directed to the modified form shown in Fig. 4. Here the usual valve casing 1 is shown having the inlet opening 2, but with a tapered or frusto-conical seat port opening 29 as indicated at 31. In this construction, the modified valve closure member is generally designated 32. In a horizontal plane and at an upper portion thereof received within the seat opening the closure member 32 provided with a shoulder 33 serrated as at 34 for the same reasons as described in connection with Figs. 1 and 2 to cooperate with the disc 35. The said disc member is snugly received over the shank portion 36 of the closure member 32 and is made of a diameter sufficiently large so that its outer peripheral portion as at 37 extends slightly beyond the tapered surface 38 of the said closure member. The disc is chamfered at its upper corner portion, as indicated, to allow for suitable displacement of the disc material when seating the valve. Similarly, a retaining washer 39 is provided, preferably having an outer tapered periphery 41 forming a continuation of the tapered surface 38 of the closure member 32 and is snugly received over the shank portion 36. For reasons described in connection with Figs. 1 and 2, the washer 39 is made of a thickness sufficient to project beyond the shoulder and to permit an annular chamber 42 to be formed as indicated. It will be understood that under excessive loading in closing the valve, the frusto-conical surface 41 will contact the surface 31 to augment the seating surface 37 of the disc 35. The depending shank portion beyond the shoulder 43 extends into a recessed section 44 of the retaining nut 45. Here, similarly, for reasons of expediting the flow characteristics of the valve on its outer periphery the said retaining nut is of frusto-conical configuration as at 46 and engages the closure threaded shank 47 by means of the threads 48. A suitable headless screw 49 holds the above assembly in locked position in substantially the same general relationship as described in connection with Figs. 1 and 2.

In operation, it will be clear that as the valve is closed, annular contact at the peripheral edge or corner portion 51 of the ring 35 is made as indicated and as the valve is closed with even greater compressive load the said corner portion slidingly moves downward along the frusto-conical surface to a degree or limit determined when contact is made by the surface 41 of the washer with the surface 31, as more clearly shown in Fig. 5. Also as shown in Fig. 5, the sideward thrust to the serrations is applied to the surfaces as indicated at 33.

Thus, the same principle of operation applies to this modified form as described in connection with Figs. 1 and 2, except that since the seating ring is fastened securely to the closure member 32, sufficient torque must be applied to the valve stem to compensate for the contraction of the seating member 35 away from the seat. In all other respects, the operation is similar to that previously referred to.

It is clear that a new type of valve seat structure and operation has been devised capable of meeting extremely severe low temperature conditions, and while only a couple of embodiments have been shown and described, it should be apparent that other valve structures may be used employing the same principle within the purview of this invention as determined by the appended claims.

We claim:

1. In a valve construction, the combination of a valve casing with an annular multiple shouldered portion and a port therethrough, a reciprocally movable valve closure member therefor having a substantially conical seating surface, the said casing carrying an annular valve seat assembly having a fluid passage therethrough in axial alignment with said casing port, the said seat assembly comprising a thin plate-like disc of relatively soft resilient material surrounding said casing port and being supported on a first shoulder of said multiple shouldered portion for cooperation with said closure member, a second shoulder extending outwardly of said first shoulder, the said first shoulder having a substantially concentrically serrated surface to receive said disc, a washer overlying said resilient disc and being of a thickness sufficient when superposed on said disc to extend above said second shoulder of said multiple shouldered portion to bear against said disc to hold said disc firmly against the said first shoulder and cause the serrations to bite into the undersurface of the said disc, rotatable retainer means overlying and being spaced from said second shoulder cooperating with the seat assembly to hold said washer against the disc, and resiliently annularly disposed locking means cooperating with an inner annular chamber portion of the valve casing to hold the said retainer means position, the said latter locking means being formed to permit said closure member to pass therethrough in the course of opening and closing the valve construction.

2. In a valve construction, the combination of a valve casing with an annular multiple shouldered portion and a port therethrough, a reciprocally movable valve closure member therefor having a substantially conical seating surface, the said casing carrying an annular valve seat assembly having a fluid passage therethrough in axial alignment with said casing port, the said seat assembly comprising a thin plate-like disc of relatively soft resilient material surrounding said casing port and being supported on a first shoulder of said multiple shouldered portion for cooperation with said closure member, the said first shoulder having a concentrically serrated surface to receive said disc, a washer overlying said resilient disc and being of a thickness sufficient when superposed on said disc to extend above a second shoulder of said multiple shouldered portion to bear against said disc to hold said disc firmly against the said first shoulder and cause the serrations to bite into the undersurface of the said disc, retainer means overlying and being spaced from said second shoulder and cooperating with the seat assembly to hold said washer in firm abutting relation against a transverse annular surface of the said disc, and holding means cooperating with an inner annular chamber portion of the valve casing to hold the said retainer means in predetermined position, the said latter holding means being apertured and of substantially C-configuration when viewed in plan to enable said closure member to move therethrough in the course of opening and closing the valve construction.

3. In a valve construction, the combination of a valve casing with an annular multiple shouldered portion and a frusto-conical fluid passage therethrough, a reciprocally movable valve closure member therefor having a substantially conical surface movable within said casing passage, one of said casing and closure member having an annular fluid sealing means thereon, the said sealing means comprising a relatively thin plate-like soft disc of resilient material determining the limit of a portion of said casing passage and cooperating with said casing and said closure member to fit snugly within an annular recess therebetween defined in part by a first shoulder and support for said plate-like disc of said multiple shouldered portion, the said first shoulder and support being on one of said casing and said closure member and having at least a portion thereof defined by a substantially concentric serrated annular surface extending substantially to the periphery forming said casing passage to receive said resilient disc thereon in abutting contact relation, a washer abutting said resilient disc, said washer and said resilient disc being of a combined thickness sufficient to extend slightly beyond a second shoulder of said multiple shouldered portion and having a transverse annular surface bearing against said disc to hold said disc firmly against said first shoulder, retaining means overlying and spaced from said second shoulder for holding said disc firmly against the said serrated annular surface whereby to cause said serrations to bite into a transverse annular surface of the said soft disc thereby to restrain the latter against bodily transverse movement relative to the valve central axis, the said washer and disc being mounted in superposed relation within said annular recess, the said washer having an annular tapered surface of a predetermined diameter and taper substantially corresponding with the taper of the conical surface of the closure member and providing a seating contact for the said closure member substantially immediately after the said closure member has predeterminately deformed an annular corner portion of the plate-like disc.

4. The subject matter of claim 3, the said disc being of a material of the class of polymonochlorotrifluoroethylene ($CF_2CFCl$).

References Cited in the file of this patent
UNITED STATES PATENTS

| | | |
|---|---|---|
| 1,093,117 | Deiller | Apr. 14, 1914 |
| 1,616,672 | Wilson | Feb. 8, 1927 |
| 2,223,509 | Brauer | Dec. 3, 1940 |
| 2,645,449 | Gulick | July 14, 1953 |
| 2,767,956 | Rubin | Oct. 23, 1956 |
| 2,770,443 | Rand | Nov. 13, 1956 |

FOREIGN PATENTS

| | | |
|---|---|---|
| 18,993 | Great Britain | of 1905 |
| 946,692 | Germany | Aug. 23, 1956 |

OTHER REFERENCES

Chemical & Engineering News, Vol. 30 (April–June 1952) (pp. 2688–2691). (Copy in Div. 39.) 251–368.